(12) United States Patent
Lesesky et al.

(10) Patent No.: US 6,608,554 B2
(45) Date of Patent: *Aug. 19, 2003

(54) APPARATUS AND METHOD FOR DATA COMMUNICATION BETWEEN VEHICLE AND REMOTE DATA COMMUNICATION TERMINAL

(75) Inventors: Alan Lesesky, Charlotte, NC (US); Bobby Ray Weant, Rock Hill, SC (US)

(73) Assignee: Vehicle Enhancement Systems, Inc., Rock Hill, SC (US)

( * ) Notice: Subject to any disclaimer, the term of this patent is extended or adjusted under 35 U.S.C. 154(b) by 197 days.

This patent is subject to a terminal disclaimer.

(21) Appl. No.: 10/007,032

(22) Filed: Nov. 8, 2001

(65) Prior Publication Data

US 2002/0060625 A1 May 23, 2002

Related U.S. Application Data

(63) Continuation of application No. 09/569,995, filed on May 12, 2000, now Pat. No. 6,411,203, which is a continuation of application No. 08/907,861, filed on Aug. 8, 1997, now Pat. No. 6,064,299, which is a continuation-in-part of application No. 08/594,255, filed on Jan. 30, 1996, now Pat. No. 6,111,524, which is a continuation-in-part of application No. 08/554,907, filed on Nov. 9, 1995, now abandoned.

(51) Int. Cl.$^7$ .............................................. G08B 21/00
(52) U.S. Cl. ..................... 340/431; 340/933; 340/944
(58) Field of Search ................................. 340/431, 928, 340/933, 942, 944, 10.4, 10.41, 825.69, 825.72; 307/10.1, 9.1

(56) References Cited

U.S. PATENT DOCUMENTS 4,328,494 A  * 5/1982  Goodall ................. 340/870.18

| | | | |
|---|---|---|---|
| 4,398,172 A | 8/1983 | Carroll et al. | 340/942 |
| 4,506,386 A | 3/1985 | Ichikawa et al. | 455/343 |
| 4,952,908 A | 8/1990 | Sanner | 340/429 |

(List continued on next page.)

FOREIGN PATENT DOCUMENTS

| | | | |
|---|---|---|---|
| EP | 0744322 A2 | 11/1996 | ............. 16/2 |
| EP | 0 802 082 A2 | 10/1997 | |
| WO | 93/22848 | 11/1993 | |
| WO | 97/17232 | 5/1997 | ............. 16/2 |

(List continued on next page.)

OTHER PUBLICATIONS

"Materialflub per Infrarot", Technische Rundschau, 1990.
Translation of article entitled "Materialflub per Infrarot", Technische Rundschau, 1990.
Affidavit by Alan C. Lesesky.

Primary Examiner—Van Trieu
(74) Attorney, Agent, or Firm—Bracewell & Patterson, LLP (57) ABSTRACT

An apparatus and methods are provided for data communications associated with a heavy duty vehicle. The apparatus preferably includes at least one electronic subsystem associated with the heavy duty vehicle and a plurality of electrical conductors connected to the at least one electronic subsystem and associated with the heavy duty vehicle. A vehicle data communications protocol converter is preferably connected to the plurality of electrical conductors for converting a first data communications protocol associated with data communications along the plurality of electrical conductors to a second data communications protocol such as an infrared or an RF data communications protocol. The apparatus also preferably includes a transceiver connected to the data communications protocol converter for transmitting the second data communications protocol from the heavy duty vehicle and receiving the data communications protocol from a remote data communications terminal.

33 Claims, 8 Drawing Sheets

U.S. PATENT DOCUMENTS

| | | | |
|---|---|---|---|
| 4,996,719 A | 2/1991 | Okazaki et al. | 455/606 |
| 5,025,253 A | 6/1991 | Dilullo et al. | 340/825.54 |
| 5,081,667 A | 1/1992 | Drori et al. | 379/59 |
| 5,385,476 A | 1/1995 | Jasper | 439/38 |
| 5,442,810 A | 8/1995 | Jenquin | 455/99 |
| 5,446,470 A | 8/1995 | Avignon et al. | 343/713 |
| 5,488,352 A | 1/1996 | Jasper | 340/481 |
| 5,570,087 A | 10/1996 | Lemelson | 340/870.05 |
| 5,587,890 A | 12/1996 | Happ et al. | 361/826 |
| 5,677,667 A | 10/1997 | Lesesky et al. | 340/431 |
| 5,716,071 A | 2/1998 | Stanley et al. | 280/407 |
| 5,732,074 A | 3/1998 | Spaur et al. | 370/313 |
| 5,739,592 A | 4/1998 | Rigsby et al. | 307/9.1 |
| 5,783,993 A | 7/1998 | Briski et al. | 340/525 |
| 5,790,536 A | 8/1998 | Mahany et al. | 370/338 |
| 5,794,164 A | 8/1998 | Beckert et al. | 701/1 |
| 5,798,577 A | 8/1998 | Lesesky et al. | 307/10.7 |
| 5,802,545 A | 9/1998 | Coverdill | 711/35 |
| 5,818,127 A * | 10/1998 | Abraham | 340/310.07 |
| 5,825,287 A | 10/1998 | Zarybnicky, Sr. et al. | 340/453 |
| 5,852,405 A | 12/1998 | Yoneda et al. | 340/825.02 |
| D403,659 S | 1/1999 | Lesesky | D13/156 |
| D404,170 S | 1/1999 | Lesesky | D26/124 |
| 5,900,803 A | 5/1999 | Politz et al. | 340/825.54 |
| 5,913,180 A * | 6/1999 | Ryan | 702/45 |
| 5,917,632 A | 6/1999 | Lesesky | 340/431 |
| 6,025,563 A | 2/2000 | Lesesky et al. | 177/136 |
| 6,064,299 A | 5/2000 | Lesesky et al. | 340/431 |
| 6,089,588 A | 7/2000 | Lesesky et al. | 280/422 |
| 6,111,524 A | 8/2000 | Lesesky et al. | 340/942 |
| 6,127,939 A | 10/2000 | Lesesky et al. | 340/438 |
| D434,006 S | 11/2000 | Lesesky et al. | D13/147 |
| 6,150,793 A | 11/2000 | Lesesky et al. | 320/104 |
| 6,254,201 B1 | 7/2001 | Lesesky et al. | 303/122.02 |

FOREIGN PATENT DOCUMENTS

| | | | |
|---|---|---|---|
| WO | 97/28988 | 8/1997 | 16/2 |
| WO | 98/34812 | 8/1998 | 7/70 |
| WO | 98/37432 | 8/1998 | |
| WO | 99/06987 | 2/1999 | |
| WO | 99/21383 | 4/1999 | 7/30 |
| WO | 99/35009 | 7/1999 | 16/2 |

* cited by examiner

Fig. 2.

APPARATUS AND METHOD FOR DATA COMMUNICATION BETWEEN VEHICLE AND REMOTE DATA COMMUNICATION TERMINAL

RELATED APPLICATIONS

This application is a continuation of U.S. Ser. No. 09/569,995 filed on May 12, 2000 now U.S. Pat. No. 6,411,203, which is a continuation of U.S. Ser. No. 08/907,861, filed Aug. 8, 1997, now issued as U.S. Pat. No. 6,064,299, which is a continuation-in-part of U.S. Ser. No. 08/594,255 filed Jan. 30, 1996 now issued as U.S. Pat. No. 6,111,524 which is a continuation-in-part of U.S. Ser. No. 08/554,907 filed Nov. 9, 1995, now abandoned, the disclosures of which are hereby incorporated by reference in their entirety.

FIELD OF THE INVENTION

The present invention relates to the field of heavy duty vehicle data communications and, more particularly, to data communications from a heavy duty vehicle, such as a tractor or a trailer of a truck, to a remote location.

BACKGROUND OF THE INVENTION

Over the years, the heavy duty vehicle industry has used tractor and trailer combinations to transport cargo over the roadways to various desired destinations. The tractors and trailer are conventionally mechanically coupled together so that the tractor efficiently and effectively pulls the trailer. Often, one or more additional trailer are also mechanically coupled to another trailer so that only one tractor pulls a plurality of trailers.

Various links between the tractor and the trailer provide vehicle subsystems, e.g., hydraulic, pneumatic, or electrical, with power and/or control signals to operate effectively. These subsystem have associated electrical conductors, pneumatic lines, or hydraulic lines extending between the tractor and trailer(s) so that these subsystems can effectively operate.

Data communications between a tractor and trailer for these subsystems also has been developed. An example of this data communications can be seen in U.S. Pat. No. 5,488,352 by Jasper titled "Communications And Control System For Tractor/Trailer And Associated Method" which is assigned to the common assignee of the present application. As described in this patent, the use of the Society of Automotive Engineering ("SAE") standard J1708 titled "Serial Data Communications Between Microcomputer Systems In Heavy Duty Vehicle.Applications" and SAE standard J1939 are also known for data communications in the heavy duty vehicle environment.

Only recently, however, has the heavy duty vehicle industries begun to use sophisticated electrical electronic subsystems in and associated with these vehicles to perform varied task that usually involve data manipulation and transmission. Previously, computers, controllers, and computer-type electrical systems were simply not found in these vehicles, such as the tractor and trailer combinations or recreational vehicles, in a significant manner. Much of this previous slow or lack of development and advances could be attributed, for example, to the lack of governmental or other authoritative initiatives which would have otherwise required systems to be installed on these heavy duty vehicles to include sophisticated electronics and data communications.

Although only recently have advances been made with data communications in the heavy duty vehicle industries, many of the advances require extensive retrofitting or extensive additions to the heavy duty vehicle. Accordingly, many vehicle owners have been hesitant to adopt and purchase sophisticated electronics and data communications because of the expense and uncertainty with the advances in the technology. Yet, having the capability to monitor and communicate with the various electronic subsystems of a heavy duty vehicle such as a tractor-trailer truck or recreational vehicle can be beneficial to the driver, the owner, governmental officials or agencies, and others having an interest in the heavy duty vehicle industries.

SUMMARY OF THE INVENTION

With the foregoing in mind, the present invention advantageously provides an apparatus and methods of data communication between a heavy duty vehicle and a remote data communication terminal so that various operating characteristics of the vehicle can be monitor or observed. The present invention also advantageously provides an apparatus and methods of data communication for discretely and compactly communicating data between a heavy duty vehicle and a remote data communication terminal. The present invention additionally provides an apparatus and method of data communication which is readily adapted to existing heavy duty vehicle data communication technology and does not require either extensive retrofitting or extensive and expensive additions to existing heavy duty vehicle data communication technology. The present invention further advantageously provides an apparatus and methods of data communication so that when the apparatus is mounted to a heavy duty vehicle a third party would not readily recognize that the heavy duty vehicle is equipped for data communications from the vehicle to a remote data communications terminal.

More particularly, a combination of a heavy duty vehicle and a data communication apparatus are provided according to the present invention. The heavy duty vehicle is preferably a tractor and a trailer connected to the tractor. The tractor preferably includes a cab. The data communications apparatus is preferably connected to the tractor and the trailer for communicating data to and from the tractor and the trailer to a remote data terminal. The data communications apparatus preferably includes a plurality of electrical conductors associated with and extending between the tractor and the trailer. A connector is connected in series with the plurality of electrical conductors and positioned in the cab of the tractor. The apparatus also includes vehicle data communications protocol converting means connected to the plurality of electrical conductors for converting a first data communications protocol used to communicate data along the plurality of electrical conductors to a second data communications protocol. For example, the second data communications protocol is preferably one of either an infrared data communications protocol or a radio frequency ("RF") data communications protocol. A first transceiver is associated with the connector and is connected to the vehicle data communications protocol converting means for transmitting and receiving the second data communications protocol. A remote data communication terminal which preferably includes a second transceiver for transmitting the second data communications protocol to the first transceiver and receiving the data communications protocol from the first transceiver.

Also, according to another aspect of the present invention, the data communication apparatus preferably includes a plurality of electrical conductors associated with a heavy duty vehicle. Vehicle data communications protocol converting means is preferably connected to the plurality of electrical conductors for converting a first data communications protocol associated with data communications along the plurality of electrical conductors to a second data communications protocol. The apparatus also preferably includes a transceiver connected to the vehicle data communications protocol converter for transmitting the data communications protocol from the heavy duty vehicle and receiving the data communications protocol from a remote data communications terminal.

According to yet another aspect of the present invention, an apparatus for data communications associated with a heavy duty vehicle preferably includes a transceiver housing adapted to be detachably connected to a connector mounted to a heavy duty vehicle. The connector is connected to a plurality of electrical conductors associated with the heavy duty vehicle. Vehicle data communications protocol converting means is preferably positioned in the transceiver housing for converting a first data communications protocol associated with data communications along the plurality of electrical conductors to a second data communications protocol. The apparatus also has a transceiver positioned within the transceiver housing and connected to the vehicle data communications protocol converting means for transmitting the second data communications protocol from the heavy duty vehicle and receiving the data communications protocol from a remote data communications terminal.

Still another aspect of the present invention, an apparatus for data communications associated with a heavy duty vehicle preferably includes a transceiver housing mounted to a heavy duty vehicle. The transceiver housing is preferably a vehicle light housing such as a side light marker housing. Vehicle data communications protocol converting means is preferably positioned in the transceiver housing for converting a first data communications protocol associated with data communications along the plurality of electrical conductors to a second data communications protocol. A transceiver is preferably positioned within the transceiver housing and is connected to the vehicle data communications protocol converting means for transmitting the second data communications protocol from the heavy duty vehicle and receiving the data communications protocol from a remote data communications terminal.

A method of data communications associated with a heavy duty vehicle is also provided according to the present invention. The method preferably includes providing a plurality of electrical conductors associated with a heavy duty vehicle and converting a first data communications protocol associated with data communications along the plurality of conductors to a second data communications protocol. The second data communications protocol is preferably one of either an infrared data communications protocol or a radio frequency ("RF") data communications protocol. The method also includes transmitting the data communications protocol from the heavy duty vehicle to a remote data communications terminal.

BRIEF DESCRIPTION OF THE DRAWINGS

Some of the objects and advantages of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
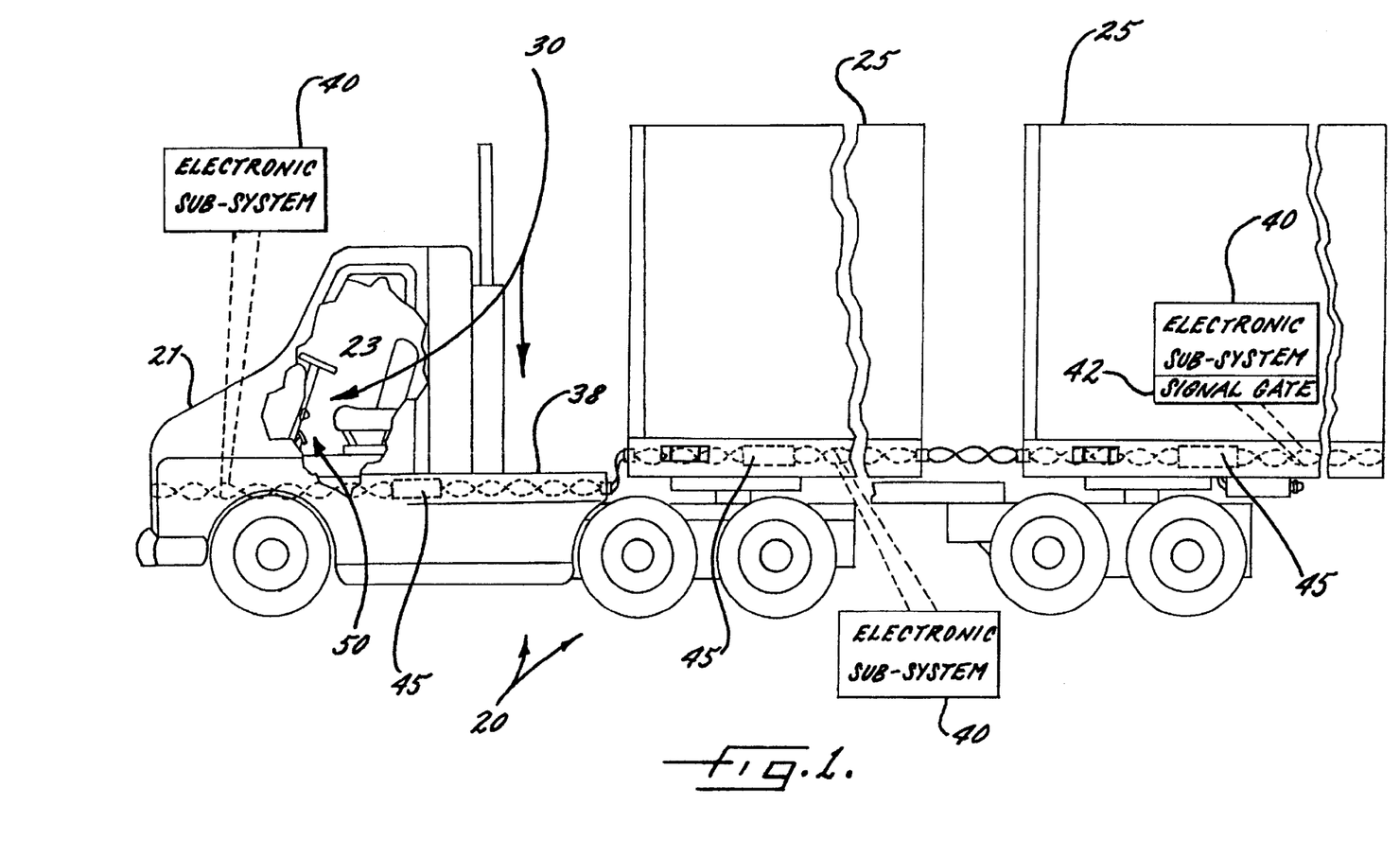
FIG. 1 is a side elevational view of a heavy duty vehicle in an embodiment as a tractor/trailer truck in combination with an apparatus for data communications between the truck and a remote data communication terminal according to the present invention.
Figure 2:
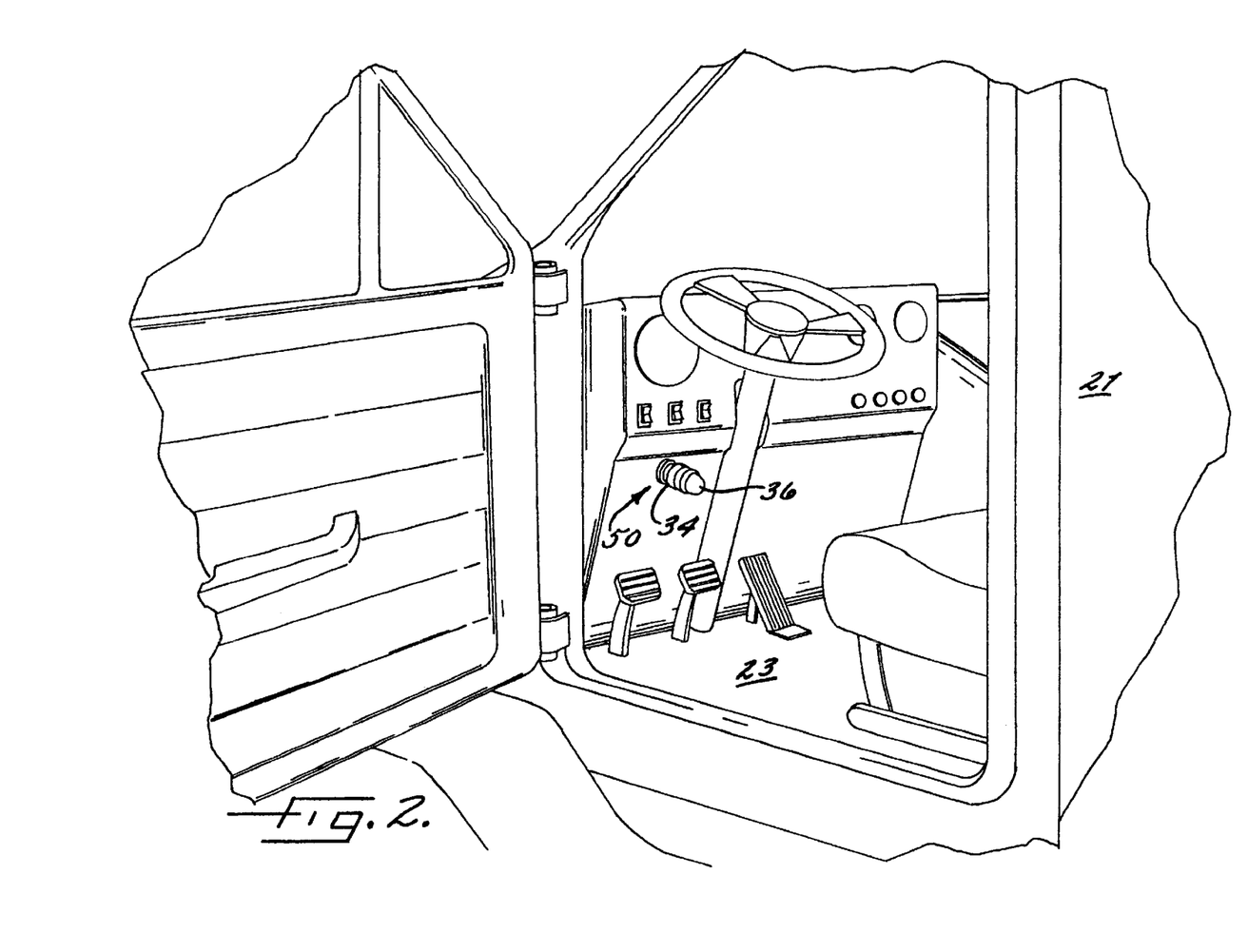
FIG. 2 is a perspective view of an apparatus for data communications between a heavy duty vehicle and a remote data communications terminal having a transceiver positioned in a cab of a tractor of a tractor/trailer truck according to a first embodiment of the present invention.
Figure 3:
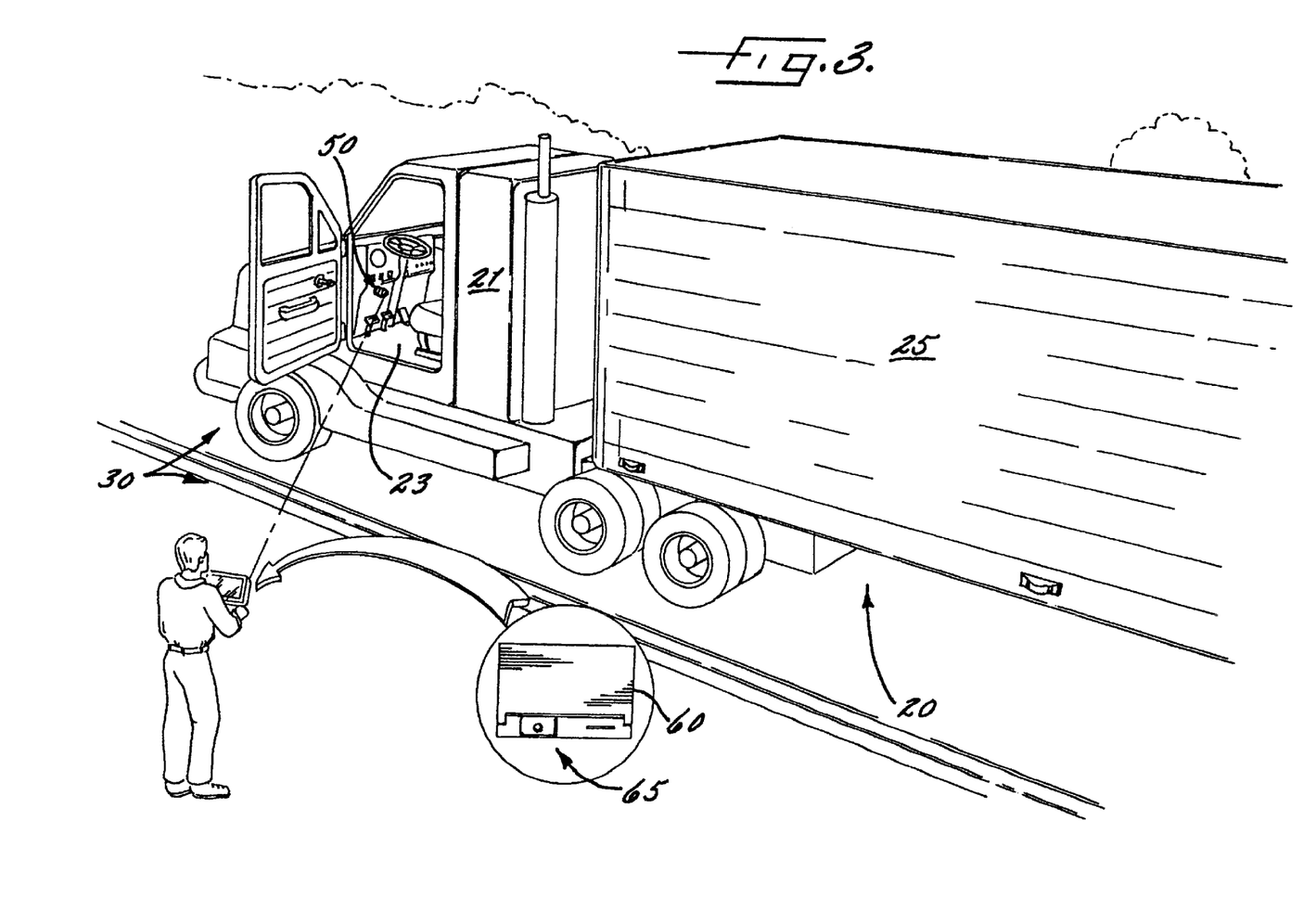
FIG. 3 is a perspective view of an apparatus for data communications between a heavy duty vehicle and a remote data communications terminal having a transceiver positioned in a cab of a tractor of a tractor/trailer truck and a remote data communications terminal positioned in the hands of a driver according to a first embodiment of the present invention.

FIGS. 1–3 illustrate an apparatus 30 for data communications associated with a heavy duty vehicle 20, namely a tractor/trailer combination or tractor/trailer truck, according to a first embodiment of the present invention. As understood by those skilled in the art, the tractor/trailer combination preferably includes a tractor 21 connected to a trailer 25 for pulling the trailer 25. The tractor 21 and trailer 25 include respective frames and coupling means for coupling the trailer 25 to the tractor 21. In addition, the tractor 21 includes an engine, such as a diesel engine or other motor, for moving the tractor 21 to thereby pull the trailer 25. It will also be understood by those skilled in the art that other types of heavy duty vehicles, such as a recreational vehicle, agricultural tractors or other heavy duty vehicles used in association with agricultural uses, can also be used according to the present invention.

The data communications apparatus 30 preferably includes at least one electronic subsystem 40 associated with the heavy duty vehicle 20. The at least one electronic subsystem 40, for example, can include an anti-locking brake system ("ABS") 41 connected to the heavy duty vehicle 20. The tractor/trailer combination, however, preferably includes a plurality of electronic subsystems associated with tractor 21 and/or trailer 25. The electronic subsystems 40 preferably produce data or includes some type of signal generating means, e.g., preferably provided by a signal generator 42. Some examples of these electronic subsystems 40 and features which may be controlled and/or monitored by the apparatus of the present invention are illustrated for a tractor/trailer combination in Table I and for an agricultural tractor in Table II below:

TABLE I

| TRACTOR | TRAILER |
| --- | --- |
| Mirror Tracking | Reefer Temperatures |
| Mirror with Trailer Display | Reefer Pressures |
| Controls for Reefer (Engine) | Trailer Identification |
| Controls for Trailer Slide Axle | Blind Spot Warning |
|  | Cargo Information |
| Controls for Landing Gear | Smoke/Fire Detection |
| Active Faring | Overall (Tanker) |
| Recorder for Trailer Functions | Cargo Shift |
| Satellite for Trailer Functions | Weight Detection |
| Brake System Information | Anti Lock Failure |
| Brake By Wire | Brake By Wire |
| Climate Controls for Reefer | Backup Lamps |
|  | Suspension Control |
|  | Sliding Axle Control |
|  | Liftable Tailgate |
|  | Time Pressure Monitor |
|  | Lamp Outage Monitor |
|  | Stop Lamp Saver (with doubles and triples) |
|  | Water in Air Reservoir |
|  | Liftable Landing Gear |
|  | Brake Temperature |
| Mirror with Trailer Display Trailer Identification | Emergency Line Pressure Detection |
| Trailer Brake Temperature | Blind Spot Warning |
| Trailer Axle Temperatures | Cargo Information |
| Trailer Security | Time Pressure Warning |
| Weight Broadcast | Smoke Detector |
| Trailer Voltage Status | Roll Over Protection |
|  | Active Conspicuity (Lighting) |
|  | Active Tire Pressure |
|  | Backup Alarm |
|  | Inventory Data Collection |
|  | Security Warning |
|  | Trailer Engine Start |
|  | Trailer Engine Monitor |
|  | Tractor/Changing from Reefer |
|  | Trailer Dome Lamps |
|  | Rear Door Lift (Motorized) |

TABLE II

| TRACTOR | IMPLEMENT |
| --- | --- |
| Vehicle Spped Optimization | Sprayer Pressure |
| Engine Speed Optimization | Speed Planning Rates |
| Implement Display | Depth Position |
| GPS (Satellite Control to Implement) | Hydraulic Controls |
|  | Speed Counting |
|  | Moisture Sensing |

The data communications apparatus 30 also preferably includes a plurality of electrical conductors 38, e.g., preferably provided by twisted pair wiring as understood by those skilled in the art, which are preferably connected to the plurality of electronic subsystems 40 and associated with the heavy duty vehicle 20. The plurality of electrical conductors 38 preferably provide one or more data communications channels or paths for data communications with the electronic subsystems 40, as well as a controller 45 as described further below herein. As perhaps best illustrated in FIGS. 5 and 11, the data communications apparatus 30 preferably also has vehicle data communications protocol converting means 33, 33', e.g., preferably provided by a vehicle data communications protocol converter as illustrated by first and second data communications protocol converters 37, 39, 37', 39' and a first signal booster 36, 36', connected to the plurality of electrical conductors 38, 38' for converting a first data communications protocol associated with data communications along the plurality of electrical conductors 38, 38' to a second data communications protocol. As understood by those skilled in the art, the first data communications protocol is preferably according to SAE J1708, but also could be according to SAE J1939 or RS-485. In other words, the first data communications protocol is preferably an existing data communications protocol conventionally associated with the tractor/trailer combination or the heavy duty vehicle 20. The first data communications protocol converter 37 is preferably an RS-485 transceiver, as understood by those skilled in the art, which transmits and receives data communications according to the J1708 protocol to the plurality of conductors 38 and transmits and receives data communications according to the RS-485 protocol to the second data communications protocol converter 39 and vice-versa.

Figure 5:
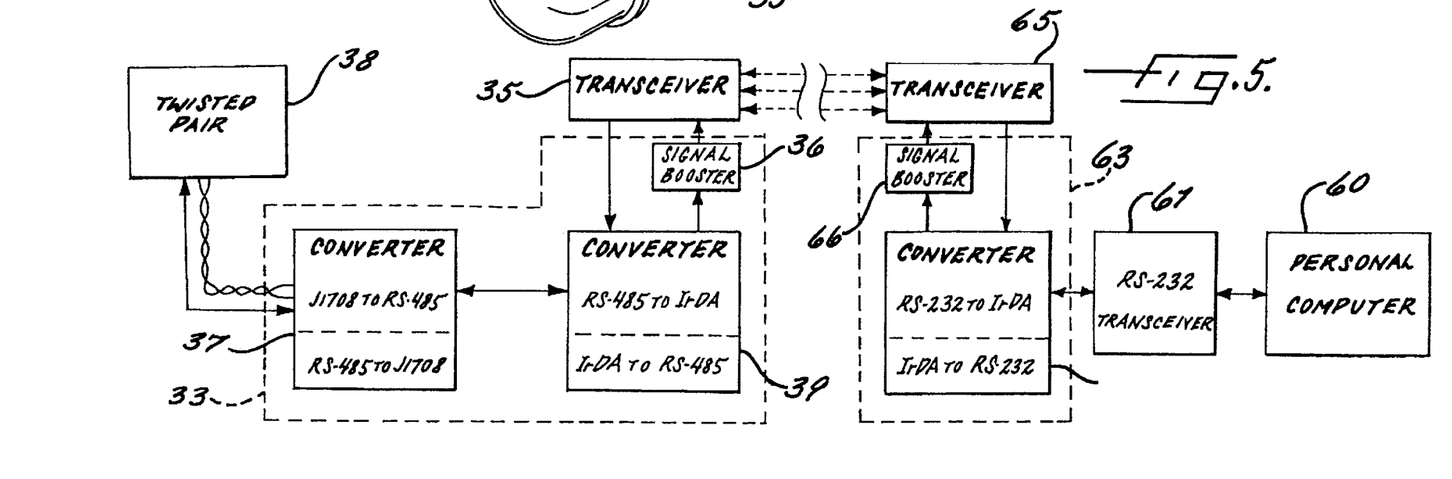
FIG. 5 is a schematic block diagram of an apparatus for data communications between a heavy duty vehicle and a remote data communications terminal according to the present invention.
Figure 11:
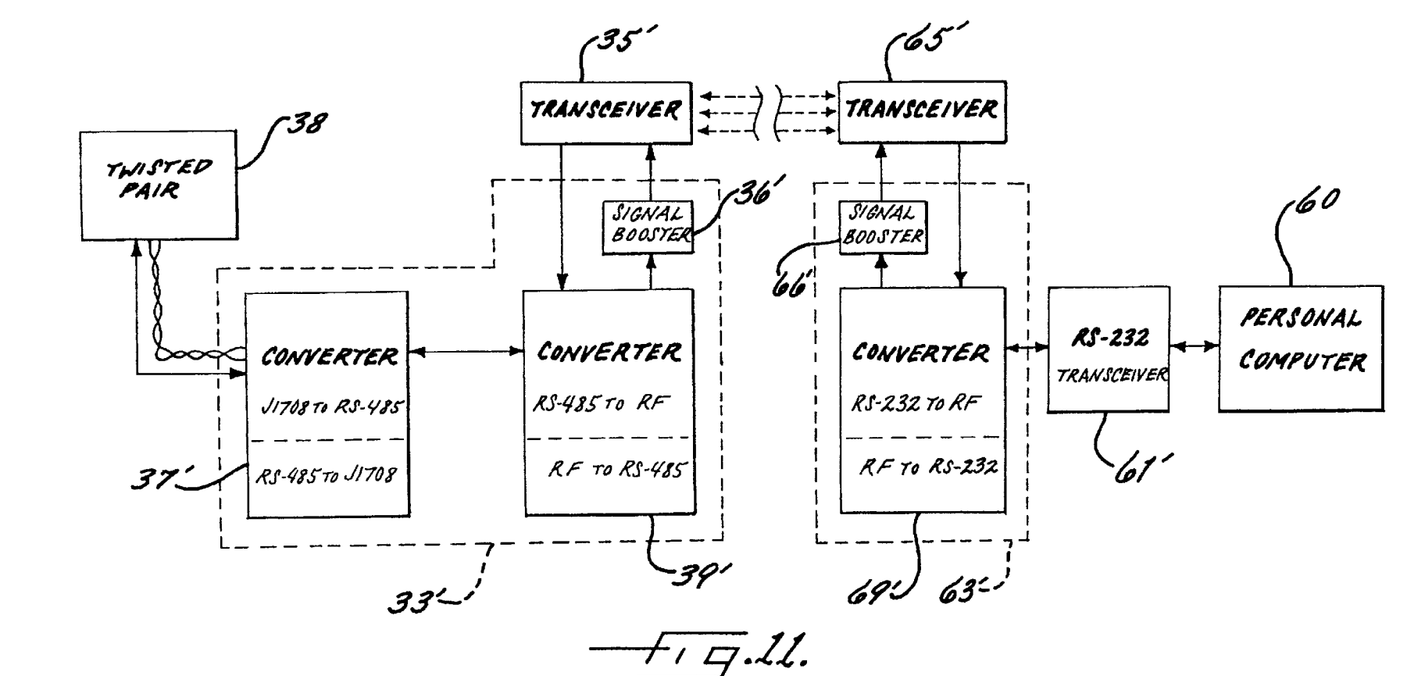
FIG. 11 is schematic block diagram of an apparatus for data communications between a heavy duty vehicle and a remote data communications terminal according to the present invention.

Additionally, the vehicle data communications protocol converting means 33 can convert the first data communications protocol, e.g., SAE J1708, into a third data communications protocol, e.g., RS-485, and then convert the third data communications protocol, e.g., RS-485, into yet the second data communications protocol, e.g., IrDa or other infrared or RF data communications protocol, which is used to transmit data through-the-air to a remote data communications terminal 60, 60' (see FIGS. 5 and 11). The second data communications protocol converter 39 preferably is a combination of a microprocessor or other microcontroller connected to the RS-485 transceiver which transmits and receives logic level signals and an infrared IrDA compliant integrated circuit, such as provided by Hewlett Packard or Rohm as understood by those skilled in the art, connected to the microprocessor which transmits and receives the logic level signals.

When transmitting from the vehicle 20, the IrDA compliant integrated circuit receives logic levels from the microcontroller and converts the logic levels to IrDA data communications protocol based upon timed infrared pulse signals of a predetermined position, pulse widths, and/or duration depending on the desired baud or bit rate of data communications. The IrDA integrated circuit also receives an infrared data communications protocol and transmits logic levels when receiving data communications from a remote data communications terminal 60. The IrDA integrated circuit can include a built-in infrared transceiver 35, e.g., an infrared light emitting diode and an infrared photodetector or photodiode. At least the infrared light emitter or light emitting diode, however, is preferably not built into the IrDA integrated circuit because the vehicle data communications protocol converting means 33 also preferably includes the first signal booster 36.

The second data communications protocol is preferably one of either an infrared data communications protocol or an RF data communications protocol. In other words, the second data communications protocol is preferably a through-the-air type of data communications protocol which does not require equipment to be coupled to the heavy duty vehicle 20 when obtaining data therefrom or monitoring vehicle operational conditions. If the data communications is according to an RF data communications protocol as illustrated in FIG. 11, then the second data communication protocol converter 39' preferably includes an RF data communications integrated circuit or analog circuit as understood by those skilled in the art which receives and transmits logic levels to a microprocessor or microcontroller and transmits and receives RF data communications according to predetermined RF data communications protocol, e.g., a simple modulation scheme or a more complex protocol such as CEBus as understood by those skilled in the art.

Additionally, particularly on the transmit portion of the vehicle data communications converting means 33, the converting means 33 also preferably includes a signal booster 36, e.g., preferably provided by amplification circuitry and/or power boosting circuitry, which advantageously boosts the transmit signal to thereby increase the successful transmit range of the associated transmit portion of the transceiver 35.

An infrared data communications protocol, such as IrDA as understood by those skilled in the art, can be particularly advantageous in association with heavy duty vehicles for numerous reasons. For example, dirt, dust, grime, corrosive atmospheres, vibration, rough handling, or other obstacles can often be readily overcome with appropriate design of the driving and receiving electronics. Also, infrared data communications is immune from electromagnetic interference ("EMI") which, as understood by those skilled in the art, can impact other types of data communications media. Further, infrared data communications would not interfere with other type of through-the-air data communications channels such as RF data communications.

Figure 4:
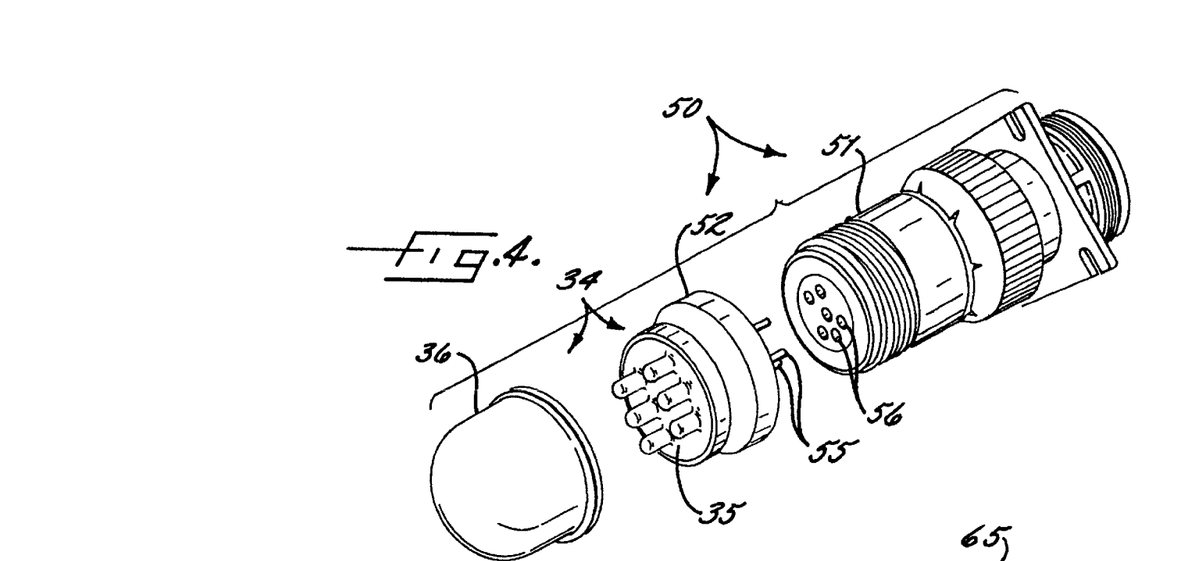
FIG. 4 is an exploded perspective view of a connector, a transceiver housing, and a transceiver of an apparatus for data communications between a heavy duty vehicle and a remote data communications terminal according to a first embodiment of the present invention.

As illustrated in FIGS. 1–2 and 4, a connector 50 is preferably connected to the plurality of electrical conductors 38. The connector 50 can also be connected to one or more of the electronic subsystems 40, e.g., an ABS system, preferably through the electrical conductors 38. For example, the connector 50 can be a six-pin Deutch connector or other well known connector associated with trucks or other heavy duty vehicles (see FIG. 4). The connector 50, in a first embodiment, also can be advantageously positioned in the cab 23 of the tractor 21 of the truck (see FIGS. 2–3). This location, for example, is a secure position for a transceiver 35, as described further below herein, because the cab 23 can be locked and a security alarm system or other security system can be associated with the cab 23. Additionally, the cab 23 provides a convenient position for the driver, government officials, or others involved in the related industry to provide access to operational conditions of the vehicle 20. This further takes advantage of existing positions of vehicle connectors to tap into or access the plurality of electrical conductors 38 which provide data or information to the cab of the tractor without requiring extensive rewiring, retrofitting, or adding expensive equipment to the vehicle 20.

Figures 8, 9:
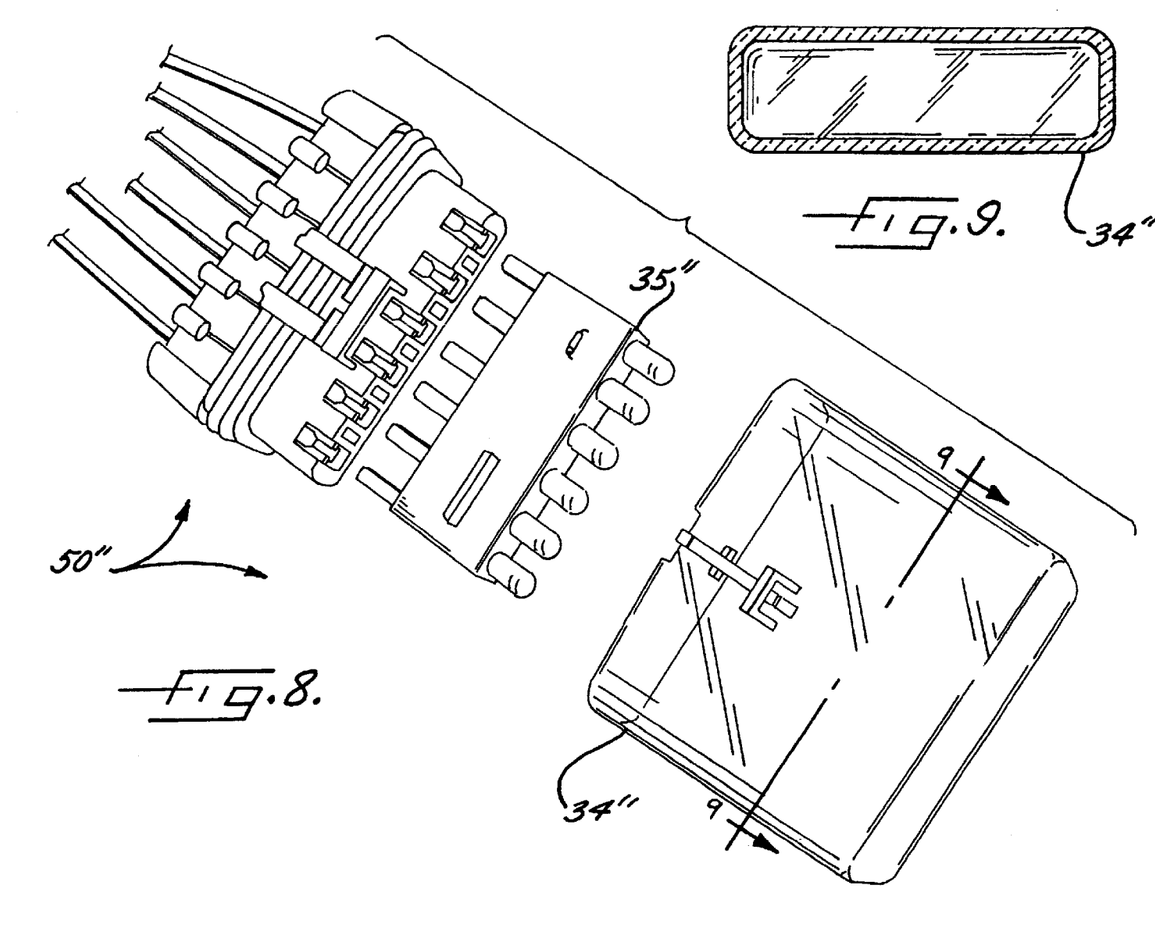
FIG. 8 is an enlarged perspective view of a connector, a transceiver housing, and a transceiver positioned in the transceiver housing of an apparatus for data communications between a heavy duty vehicle and a remote data communications terminal according to a third embodiment of the present invention.
FIG. 9 is a sectional view of a transceiver housing of an apparatus for data communications between a heavy duty vehicle and a remote data communications terminal taken along line 9—9 of FIG. 8 according to a third embodiment of the present invention.
Figure 10:
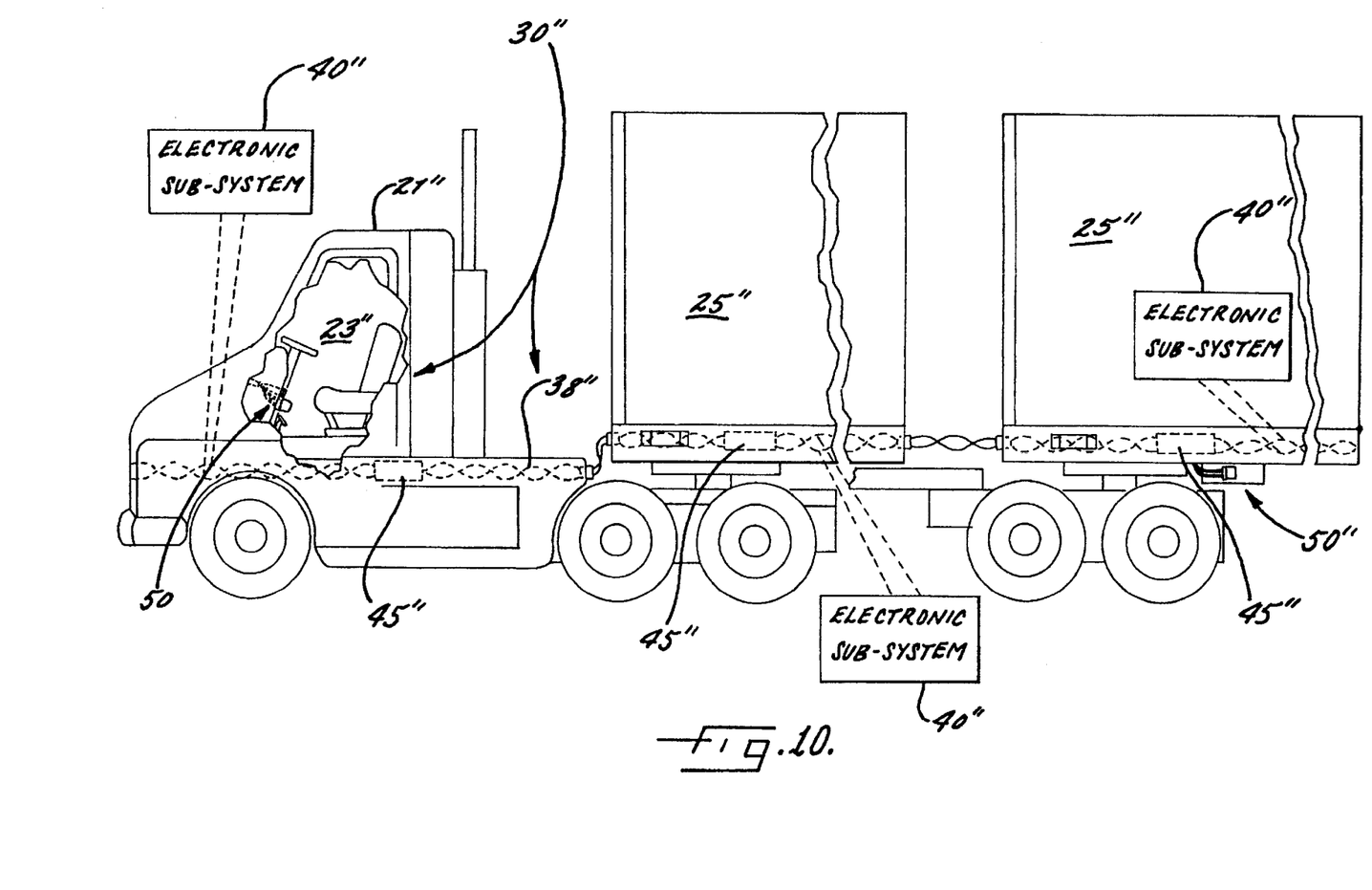
FIG. 10 is a side elevational view of an apparatus for data communications between a heavy duty vehicle and a remote data communications terminal according to a third embodiment of the present invention.

As perhaps best illustrated in FIGS. 8–10, in a second embodiment of the connector 50', for example, the connector 50' can be positioned more closely in association with one of the electronic subsystems 40 such as the ABS system of the trailer 25 of the truck. The second embodiment also illustrates a connector 50' known to those in the heavy duty vehicle art, and namely the trucking industry. This connector 50', however, is advantageously modified by adding a transceiver housing 34 and a transceiver 35 as described further below herein. In each of the first and second embodiments, the connector 50, 50' preferably includes a plurality of pins 55 having a predetermined pin configuration. The connector 50, 50' also preferably has one of either a generally cylindrical or a generally rectangular shape.

The connector 50, 50' also preferably has first and second mating connector portions 51, 52, 51', 52' which are joined together by a frictional fit so that the plurality of pins 55 are matingly received into a corresponding plurality of contact elements 56. As understood by those skilled in the art, the connector 50, 50' can also have some type of connector aligning means associated therewith for readily aligning the first and second mating connector portions 51, 52, 51', 52'.

A transceiver housing 34 is preferably detachably connected to the connector 50, 50'. The transceiver housing 34, 34' also preferably includes a translucent cover member 31 for transmitting the second data communications protocol therethrough. In a first embodiment of the transceiver housing 34, the transceiver housing 34 can either include the second mating connector portion 52 being formed as a portion of or integrally as a single piece therewith, or the second mating connector portion 52 can define the transceiver housing 34. The transceiver housing 34 in this embodiment likewise preferably has one of either a cylindrical or a rectangular shape. The transceiver housing 34 preferably includes or has integrally formed as one piece therewith an optically translucent cover member 31 for transmitting and receiving infrared or RF data communications therethrough to the remote data communications terminal 60. Advantageously, because the transceiver housing 34 forms a portion of or readily attaches to a standard vehicle connector, e.g., the first mating connector portion 51, the data communications apparatus 30 is readily adapted to existing heavy duty vehicle data communication technology and does not require either extensive retrofitting or extensive and expensive additions to existing heavy duty vehicle data communication technology.

Figures 6, 7:
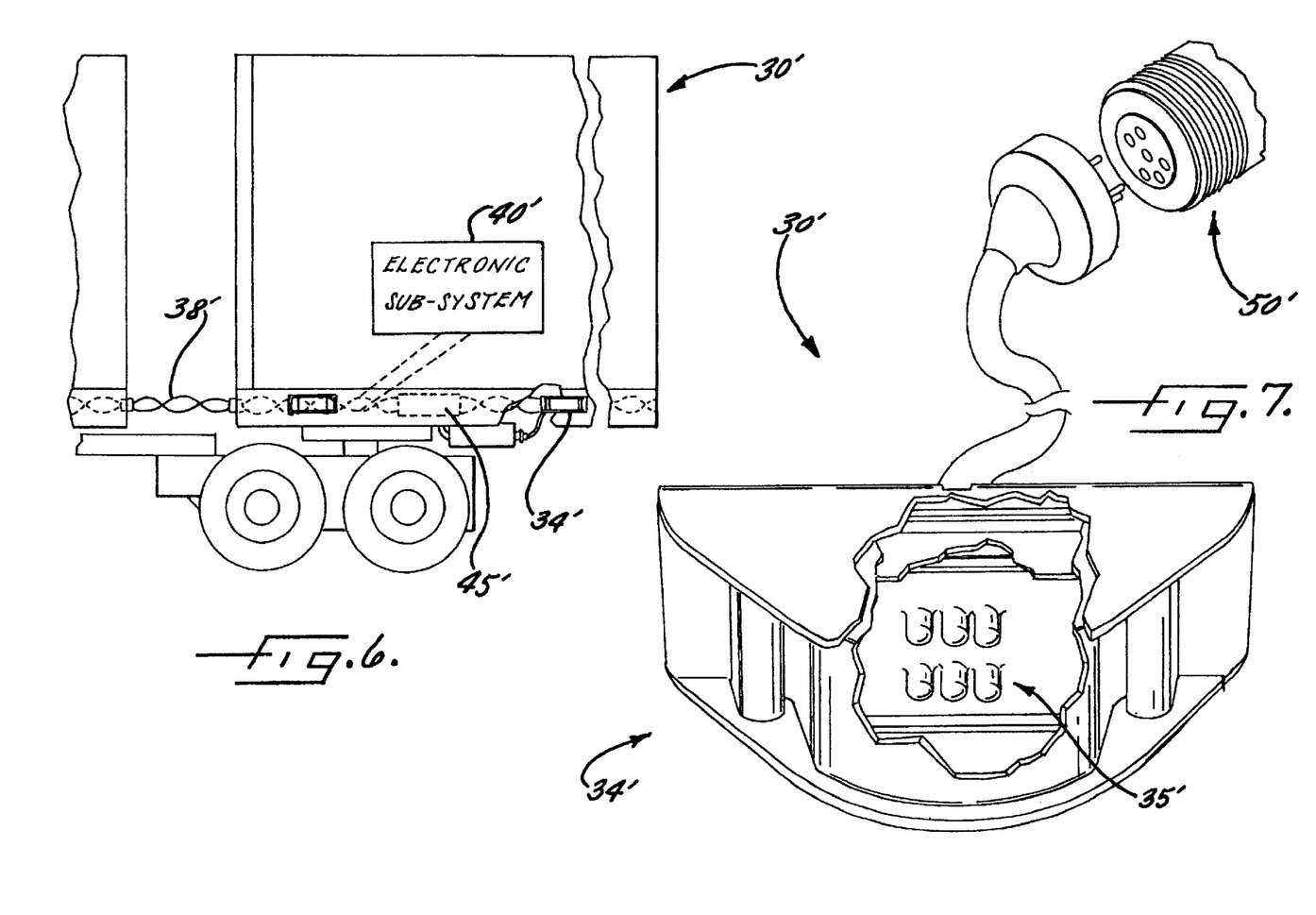
FIG. 6 is a fragmentary side elevational view of an apparatus for data communications between a heavy duty vehicle and a remote data communications terminal according to a second embodiment of the present invention.
FIG. 7 is an enlarged perspective view of a vehicle light housing in the form of a vehicle side light marker housing having portions thereof broken away for clarity and having a transceiver positioned therein of an apparatus for data communications between a heavy duty vehicle and a remote data communications terminal according to a second embodiment of the present invention.

As perhaps best illustrated in FIGS. 6–7, in a second embodiment of the transceiver housing 34', the transceiver housing 34' can advantageously be a vehicle light housing mounted to the heavy duty vehicle 20 for housing a vehicle light. The vehicle light housing, for example, can advantageously be a side-marker light housing mounted to the trailer 25 of a truck so that a third party would not readily recognize that the truck is equipped with the data communications apparatus 30.

A transceiver 35 is preferably positioned within the transceiver housing 34, 34' and connected to the vehicle data communications protocol converting means 33 for transmitting the second data communications protocol from the heavy duty vehicle 20 and receiving the data communications protocol from a remote data communications terminal 60. For infrared data communications, for example, the transceiver 35 (see also FIG. 4) preferably includes a plurality of infrared light emitter or light emitting diodes, a plurality of infrared photodiodes, and associated drive and amplification circuitry as understood by those skilled in the art.

As also understood by those skilled in the art, the transceiver 35 is preferably only a physical layer signal processing transceiver, e.g., infrared or radio frequency, and preferably includes a combination transmitter and receiver which collects data or information from the various subsystems and communicates the data to one or more remote data communications terminals 60. The transceiver 35 is preferably a first transceiver 35, and the one or more remote data communication terminals 60 preferably each include a second transceiver 65, 65' for transmitting the second data communications protocol to the first transceiver 35 and receiving the second data communications protocol from the first transceiver 35. The second transceiver 65, 65' is preferably similar to the first transceiver 35 as described herein above and accordingly for brevity will not be repeated herein.

The first and second transceivers 35, 35', 65, 65' also each include a signal processing physical layer. Advantageously, the second data communications protocol only uses the physical layer of the first and second transceivers 35, 65 for signal processing and not a data link layer ("DLL") as understood by those skilled in the art. By only using the physical layer for signal processing, the data communications and coding or modulation schemes for the communications is greatly simplified and the data conversion from one data communications protocol to another data communications protocol is also simplified.

The remote data communications terminal 60 is preferably a computer, e.g., provided by a portable laptop or handheld computer, or other portable or substantially stationary remote data collection stations as understood by those skilled in the art. The remote data communications terminal 60 also includes remote data communications protocol converting means 63, e.g., preferably provided by a remote data communication protocol converter as illustrated by the third data communications protocol converter 69 and the second signal booster 66, for converting the second data communications protocol received by the remote data communications terminal to a third data communications protocol associated with the computer. The third data communications protocol, for example, can be RS-232, RS-422, RS-423 or other data communications protocol, as understood by those skilled in the art. If two conversions occur in the vehicle data converter 33, e.g., RS-485 to RS-232 and RS-232 to IrDA or RF, then the third data communications protocol would actually be yet a fourth data communications protocol as sequentially illustrated in FIGS. 5 and 10. The remote data communications protocol converting means 63, e.g., a remote data communications protocol converter, also preferably includes data signal boosting means, e.g., a second signal booster 66 similar to the first signal booster 36 as described above herein, for boosting the range of the signal between the remote data communications terminal 60 and the first transceiver 35 of the data communications apparatus 30 to thereby increase the effective range of transmission for which the apparatus 30 is anticipated to be used. The remote data communications terminal also preferably includes a predetermined data communications protocol transceiver 61, 61', e.g., preferably provided by an RS-232 transceiver as understood by those skilled in the art, as a data communications interface to the personal computer 68 or other data terminal.

The data communications apparatus 30 according to the present invention preferably also includes at least one controller 45 connected to the at least one electronic subsystem 40 and the plurality of electrical connectors 38 for controlling data communications along the plurality of electrical conductors 38, e.g., to and from the electronic subsystem(s) 40. As understood by those skilled in the art, the controller 45 preferably includes a microprocessor or microcomputer operating under stored program control to perform various functions related to the monitoring and control of various electronic subsystems on either or both of the tractor 21 and trailer 25 or to the remote data communications terminals 60.

As set forth previously above, each electronic subsystem 40 to be controlled and/or monitored preferably includes signal generating means, e.g., preferably provided by a signal generator, connected to the controller 45 for generating a signal related to the operation of the vehicle 20. The controller 45, for example, produces or outputs a number of digital or analog output controls in the form of relay contact closures or other signals to either the subsystems or to the transceiver 35. The controller 45, for example, can also be an ABS controller which actuates control valves on the trailer 25 to control the brake chambers of the brakes associated with the trailer 25.

As illustrated in FIGS. 1–11, the present invention also includes methods of data communications associated with a heavy duty vehicle 20. The method preferably includes providing a plurality of electrical conductors 38 associated with a heavy duty vehicle 20 and converting a first vehicle data communications protocol associated with data communications along the plurality of electrical conductors 38 to a second data communications protocol. The method also includes transmitting the second data communications protocol from the heavy duty vehicle 20 to a remote data communications terminal 60. The first data communications protocol is preferably either SAE J1708 or SAE J1939. The second data communications protocol, on the other hand, is preferably one of either an infrared data communications protocol or an RF data communications protocol.

The method can also include receiving the second data communications protocol from the remote data communications terminal 60, controlling data communications along the plurality of electrical conductors 38, and generating a signal related to the operation of the vehicle 20. For example, the remote data communications terminal 60 can be a computer, and the method can include remotely converting the second data communications protocol received by the remote data communications terminal 60 to a third data communications protocol associated with the computer.

The method additionally can include positioning a connector 50 so as to be connected in series with the plurality of electrical conductors 38, positioning a transceiver 35 in association with the connector 50, detachably connecting a transceiver housing 34 to the connector 50, and positioning the transceiver 35 within the transceiver housing 34. The transceiver housing 34 preferably includes a translucent cover member 31 for transmitting and receiving the second data communications protocol therethrough.

The method can still further include providing at least one electronic subsystem 40 associated with the heavy duty vehicle 20 and connected to the plurality of electrical conductors 38 related to operation of the heavy duty vehicle 20. The transceiver 35 is preferably a first transceiver, and the remote data communication terminal 60 includes a second transceiver 65. The method also includes transmitting the second data communications protocol to the first transceiver 35 and receiving the second data communications protocol from the first transceiver 35. The first and second transceivers 35, 65 each preferably include a physical layer, and the method further includes transmitting and receiving the second data communications protocol only using the physical layer of the first and second transceivers 35, 65.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A vehicle data communication apparatus comprising:
    at least one electronic subsystem associated with a vehicle and related to the operation of the vehicle;
    a plurality of electrical conductors connected to the at least one electronic subsystem and associated with the vehicle;
    a connector connected to said plurality of electrical conductors and positioned in the vehicle;
    vehicle data communications protocol converting means connected to said plurality of electrical conductors for converting a first data communications protocol associated with data communications along the plurality of electrical conductors to a second data communications protocol;
    a first transceiver associated with said connector and connected to said vehicle data communications protocol converting means for transmitting and receiving the second data communications protocol; and
    a remote data communications terminal including a second transceiver for transmitting the second data communications protocol to said first transceiver and receiving the second data communications protocol from said first transceiver.

2. An apparatus as defined in claim 1, further comprising a transceiver housing detachably connected to said connector and positioned within the vehicle, and wherein said first transceiver is positioned within said transceiver housing.

3. An apparatus as defined in claim 2, wherein said first and second transceivers each include a signal processing physical layer, and wherein the second data communications protocol only uses the physical layer of the first and second transceivers for signal processing.

4. An apparatus as defined in claim 3, wherein said connector includes a plurality of pins having a predetermined pin configuration, and wherein said connector has one of either a substantially cylindrical or a substantially rectangular shape.

5. An apparatus as defined in claim 4, wherein said connector comprises a six-pin connector having first and second connector portions thereof, and wherein the second connector portion defines said transceiver housing.

6. An apparatus as defined in claim 1, wherein the first data communications protocol comprises one of the data communications protocols specified by at least one of the following: SAE J1708, SAE J1939, and RS-485.

7. An apparatus as defined in claim 6, wherein said at least one electronic subsystem comprises an anti-locking brake system, and wherein said connector is also connected to said anti-locking brake system.

8. An apparatus as defined in claim 1, further comprising a controller connected to said at least one electronic subsystem and said plurality of electrical connectors for controlling data communications along said plurality of electrical conductors and signal generating means connected to said controller for generating a signal related to the operation of the vehicle.

9. An apparatus as defined in claim 8, wherein said remote data communications terminal comprises a computer and further includes remote data communications protocol converting means for converting the second data communications protocol received by said remote data communications terminal to a third data communications protocol associated with said computer.

10. An apparatus as defined in claim 9, wherein said third data communications comprises at least one of the following: RS-232, RS-422, and RS-423.

11. An apparatus for data communications associated with a vehicle, the apparatus comprising:
    a plurality of electrical conductors associated with the vehicle;
    a vehicle data communications protocol converter connected to said plurality of electrical conductors to convert a first data communications protocol associated with data communications along the plurality of electrical conductors to a second data communications protocol; and
    a transceiver connected to said vehicle data communications protocol converter to transmit the second data communications protocol from the vehicle and to receive the second data communications protocol from a remote data communications terminal not connected to the vehicle.

12. An apparatus as defined in claim 11, further comprising a connector connected in series with said plurality of electrical conductors, wherein said transceiver is associated with said connector, and wherein said transceiver is positioned to transmit and receive the second data communications protocol to the remote data communications terminal.

13. An apparatus as defined in 12, further claim comprising a transceiver housing detachably connected to said connector, and wherein said transceiver is positioned within said transceiver housing.

14. An apparatus as defined in claim 12, further comprising at least one electronic subsystem associated with the vehicle and related to operation of the vehicle, the at least one electronic subsystem including an anti-locking brake system connected to the vehicle, and wherein said connector is also connected to said anti-locking brake system.

15. An apparatus as defined in claim 14, wherein said connector includes a plurality of pins having a predetermined pin configuration, and wherein said connector has one of either a generally cylindrical or a generally rectangular shape.

16. An apparatus as defined in claim 15, wherein said connector comprises a six-pin connector positioned within a passenger area of a vehicle having first and second connector portions thereof, and wherein the second connector portion defines said transceiver housing.

17. An apparatus as defined in claim 14, wherein said transceiver comprises a first RF transceiver, and wherein the remote data communication terminal includes a second RF transceiver in communication with said first RF transceiver for transmitting the second RF data communications protocol to said first RF transceiver and receiving the second RF data communications protocol from said first RF transceiver.

18. An apparatus as defined in claim 17, wherein the first and second RF transceivers each include a signal processing physical layer, and wherein the second local-area data communications protocol only uses the physical layer of the first and second transceivers for signal processing and not a data link layer to thereby simplify coding or conversion schemes.

19. An apparatus as defined in claim 18, further comprising a vehicle light housing connected to an outer surface of the vehicle for housing a vehicle light, and wherein said RF transceiver is positioned in said vehicle light housing.

20. An apparatus as defined in claim 19, wherein said vehicle light housing comprises a side-marker light housing.

21. An apparatus as defined in claim 20, wherein said RF transceiver comprises a first RF transceiver, and wherein the remote data communication terminal includes a second RF transceiver for transmitting the second data communications protocol to said first RF transceiver and receiving the second RF data communications protocol from said first RF transceiver.

22. An apparatus as defined in claim 21, wherein the first and second RF transceivers each include a physical layer, and wherein the second local-area data communications protocol only uses the physical layer of the first and second transceivers and not a data link layer to thereby simplify coding or conversion schemes.

23. An apparatus as defined in claim 18, wherein said remote data communications terminal comprises a computer not connected to the vehicle and further includes a remote data communications protocol converter to convert the second RF data communications protocol received by said remote data communications terminal to a third data communications protocol associated with said computer.

24. A method of data communications associated with a vehicle, the method comprising the steps of:
converting a first vehicle data communications protocol associated with data communications along a plurality of electrical conductors associated with a vehicle to a second data communications protocol; and
transmitting the second data communications protocol from a vehicle to a remote data communications terminal not connected to the vehicle.

25. A method as defined in claim 24, further comprising receiving the second data communications protocol from the remote data communications terminal, controlling data communications along the plurality of electrical conductors, and generating a signal related to the operation of the vehicle.

26. A method as defined in claim 25, further comprising positioning a connector so as to be connected in series with the plurality of electrical conductors and positioning a transceiver in association with the connector.

27. A method as defined in claim 26, further comprising detachably connecting a transceiver housing to the connector and positioning the transceiver within the transceiver housing, the connector being positioned within a vehicle.

28. A method as defined in claim 24, further comprising providing at least one electronic subsystem associated with the vehicle and connected to the plurality of electrical conductors related to operation of the vehicle.

29. A method as defined in claim 24, wherein the step of transmitting includes providing a first RF transceiver, and wherein the remote data communication terminal includes a second RF transceiver positioned in communication with the first transceiver, the method further comprising transmitting a second RF data communications protocol to the first RF transceiver and receiving the second RF data communications protocol from the first RF transceiver.

30. A method as defined in claim 29, wherein the first and second RF transceivers each include a physical layer, and the method further comprising transmitting and receiving the second RF data communications protocol only using the physical layer of the first and second RF transceivers and not the data link layer to thereby simplify coding or conversion schemes.

31. A method as defined in claim 29, wherein the remote data communications terminal comprises a computer not connected to the vehicle, and the method further comprises remotely converting the second RF data communications protocol received by the remote data communications terminal to a third data communications protocol associated with the computer.

32. A method as defined in claim 31, wherein the first data communications protocol comprises one of the data communications protocols specified by at least one of the following: SAE J1708, SAE J1939, and RS-485.

33. A method as defined in claim 31, wherein said third data communications comprises at least one of the following: RS-232, RS-422, and RS-423.

* * * * *